ately

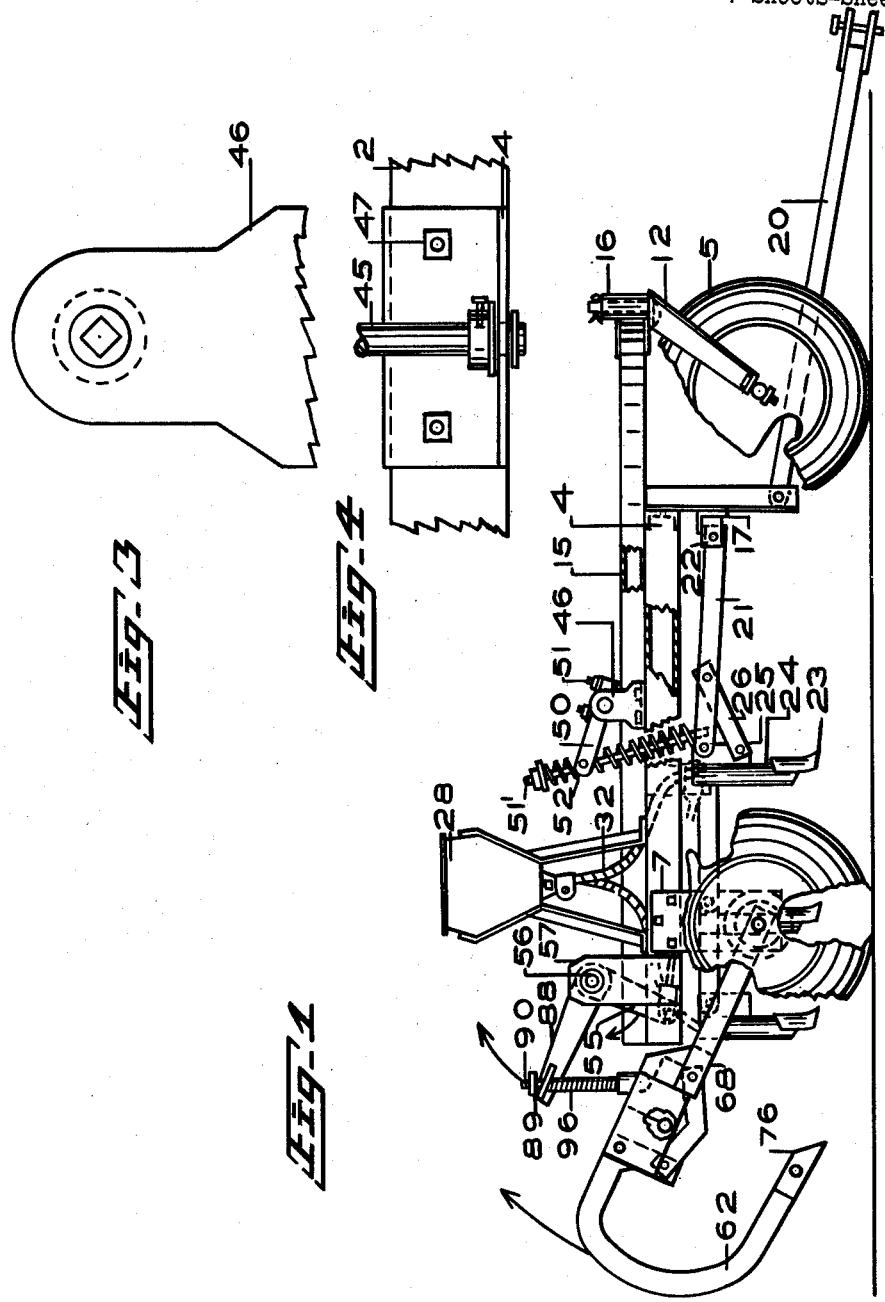

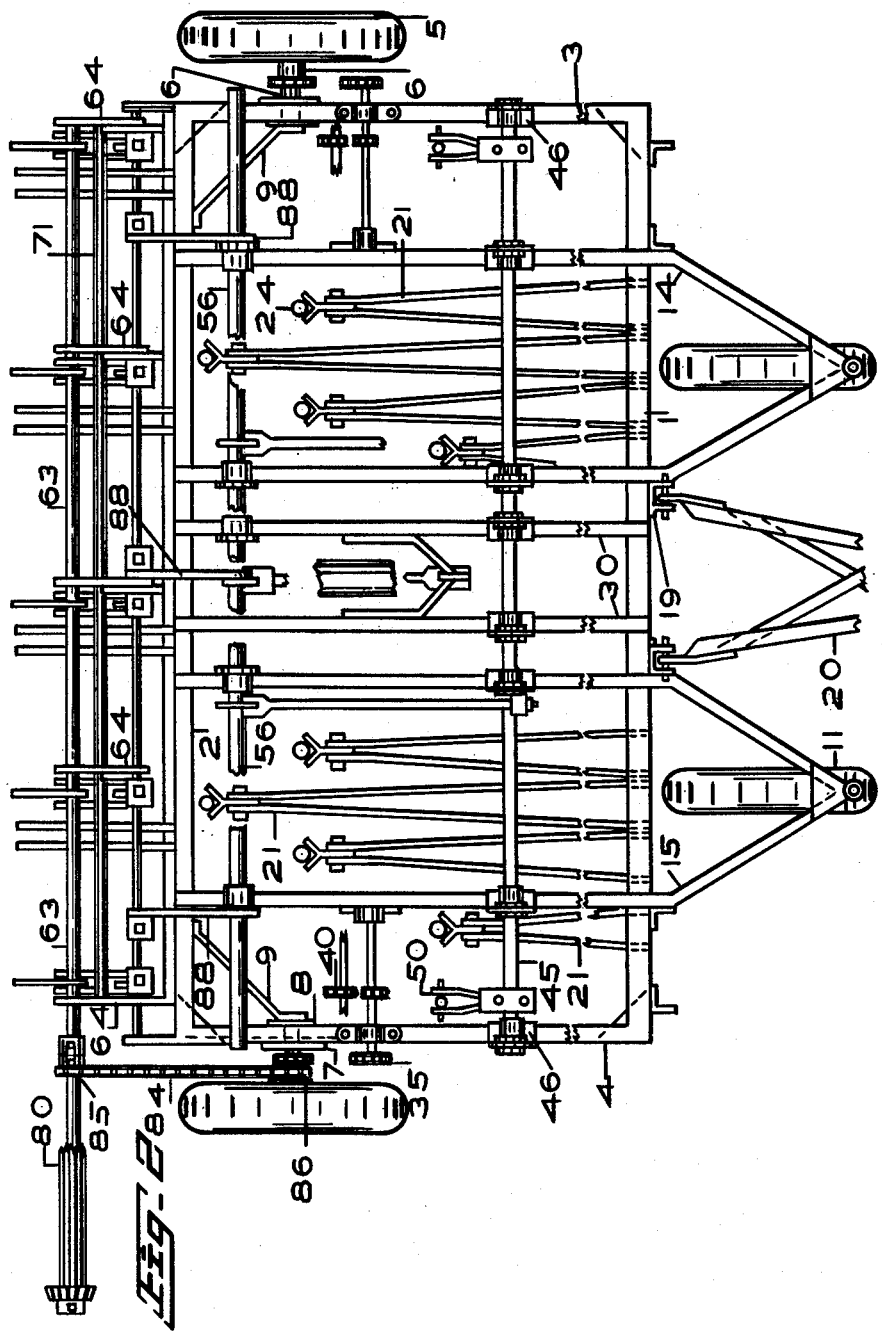

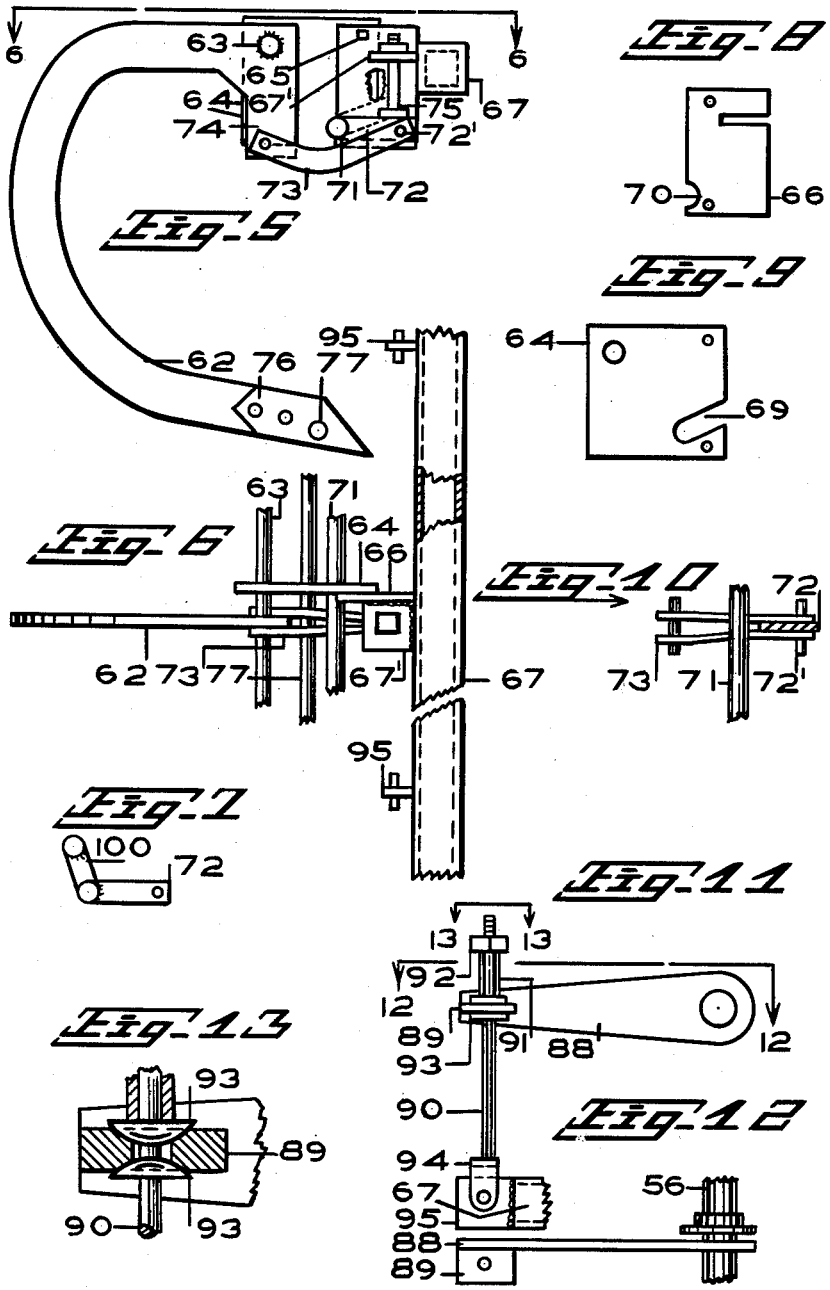

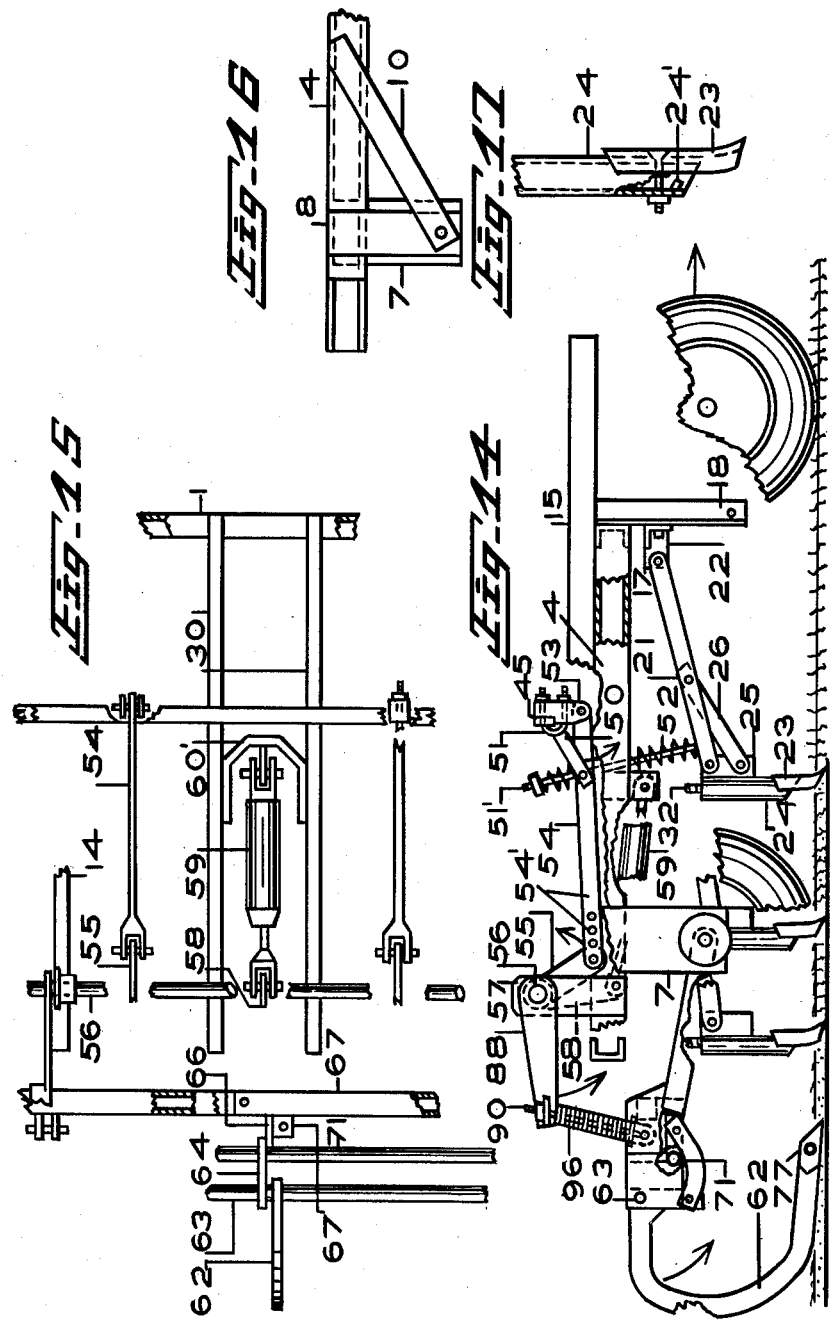

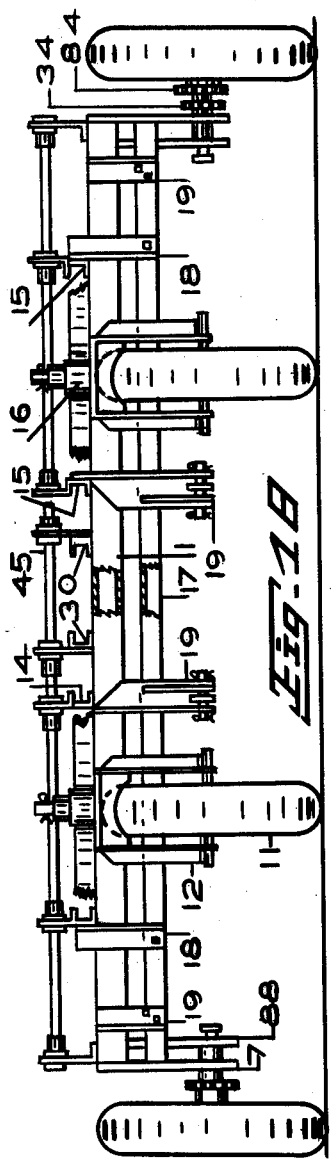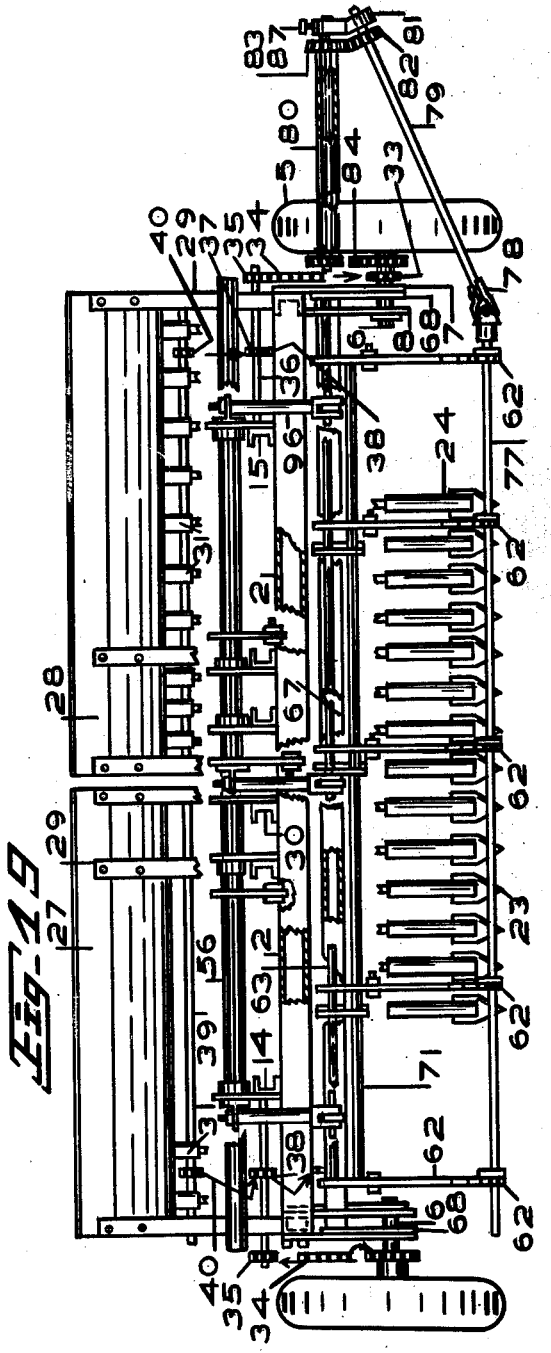

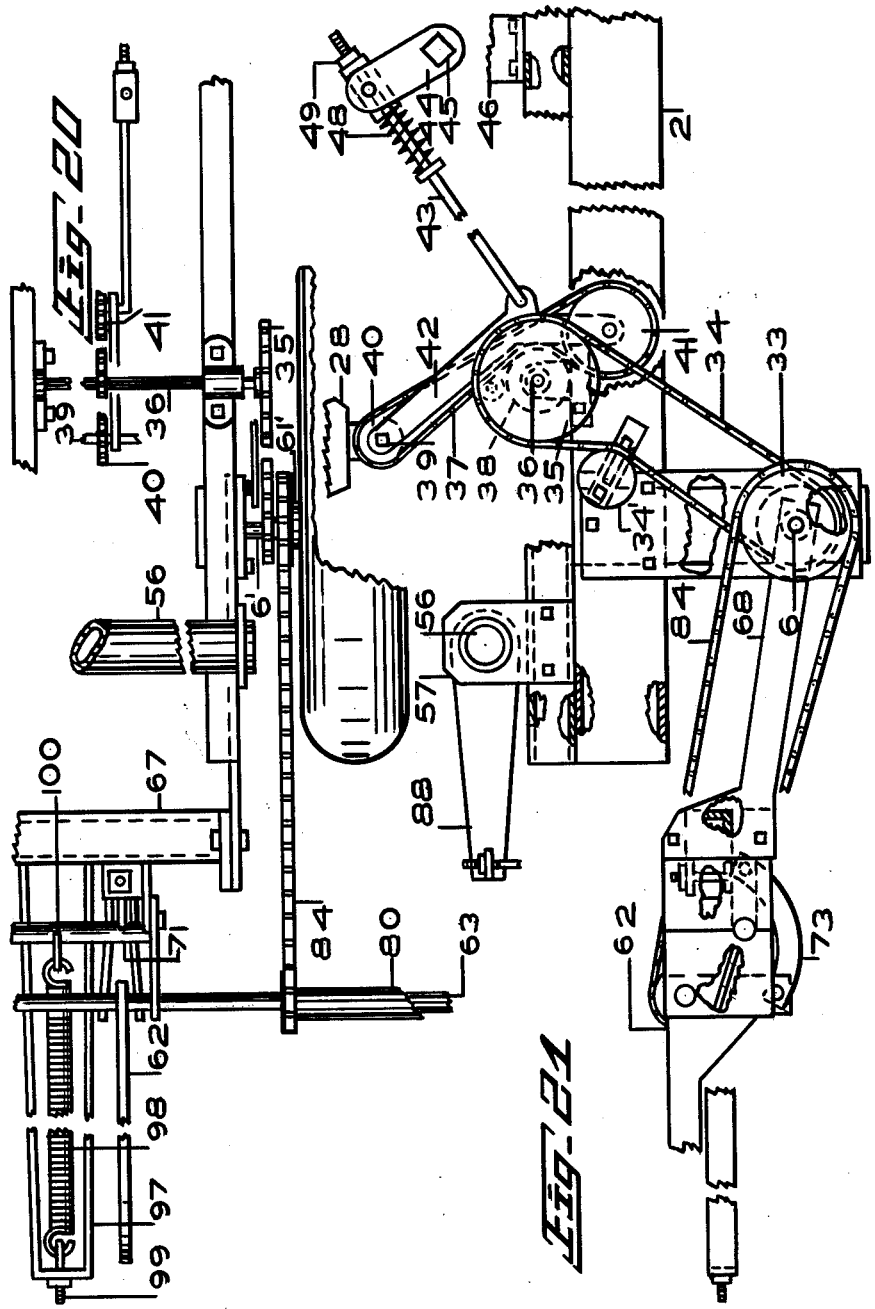

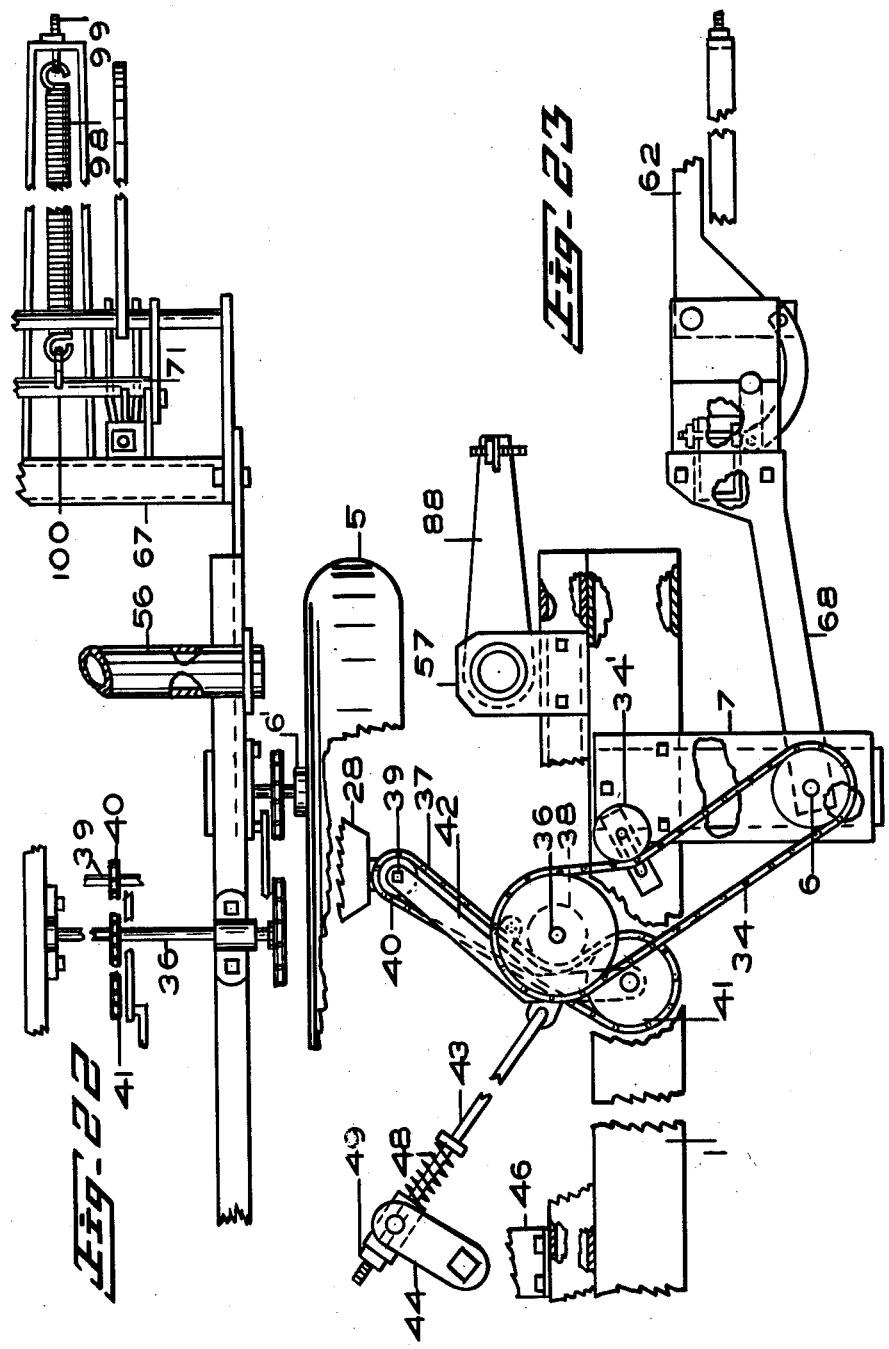

United States Patent Office 3,140,678
Patented July 14, 1964

3,140,678
COMBINED SEEDING, SOIL CULTIVATING
AND WEEDING IMPLEMENT
George Henry Morris, 37 6th Ave. N., Yorkton,
Saskatchewan, Canada
Filed Sept. 24, 1962, Ser. No. 225,451
4 Claims. (Cl. 111—67)

This invention relates to agricultural implements for use in ground tillage and grain seeding, having more particular reference to an implement embodying cultivating, seeding and weeding units in a single machine.

In the art to which the invention relates separate implements for grain seeding, and for cultivating the soil and weeding are more usually employed.

The present invention is concerned with combining such units in a single machine, and in which the units are co-ordinated for operation as a single unit.

In this the separate units for cultivating, seeding and weeding include elements of this character in common use, and the present device is concerned with combining these elements for use as a unitary whole, but additions and improvements in the separate units have been made to facilitate operation of the combined units and to more effectively perform the functions of the separate units in the combination.

The improvements include means for combining the elevation and depth adjustment of the seeding and weeding units, the former including the cultivating elements and in the latter a rotary rod weeder is used; improved mountings for the cultivating and seeding elements; and means coordinating the operating elements to effectively function together.

Other features and advantages of the invention will become apparent by reference to the accompanying description taken in conjunction with the drawings.

In the drawings, wherein is illustrated a preferred embodiment of the invention.

FIG. 1 is a side view of a combination unit in accordance with my invention, shown with the cultivating, seeding and weeding elements elevated out of working relation to the ground, parts of the machine being shown broken away and parts in section, and parts omitted for convenience of illustration.

FIG. 2 is a top plan view of the machine, with parts shown broken away to obtain a clearer view of the machine as a whole, and with parts omitted.

FIG. 3 is a detail enlarged side view of a fragment of the bracket for mounting the seeding unit elevating and depth control shaft.

FIG. 4 is a top plan view of a fragment of a main frame bar of the machine and the seeder and cultivator depth control shaft mounting bracket, with the shaft included and shown broken away.

FIG. 5 is an enlarged side view of a weeder rod carrying shank and the mounting for the shank, shown in attachment to a frame bar, and including the upper cross shaft, rocker shaft and weeder rod.

FIG. 6 is a top plan view of the parts shown in FIGURE 5, with fragments only of the shaft shown and the frame bar shown broken away and partly in section.

FIG. 7 is a side view of a rocker shaft arm for application of spring tension to the cultivating shanks.

FIG. 8 is a front view of the forward plate of a bracket for mounting a cultivator shank and associated parts.

FIG. 9 is a side view of the rearward plate of the bracket for mounting the cultivator shank and parts, attaching to the plate shown in FIGURE 8.

FIG. 10 is a top view of a link and connecting pins for engagement of a cultivator shank to the rocker shaft arm, including a fragment of the rocker shaft, and with the rocker shaft arm shown in horizontal section.

FIG. 11 is an enlarged side view showing the arm for attachment of the depth control shaft and the supporting frame bar for the cultivating shanks, and including the spring connecting rod.

FIG. 12 is an enlarged top view, taken on a line 12—12 of FIGURE 11, of the depth control shaft arm and including a fragment of the control shaft.

FIG. 13 is a detail enlarged side view taken on a line 13—13 of FIGURE 11 showing a fragment of the depth control shaft arm with the spring cushioning rod attached, shown in part in vertical section.

FIG. 14 is a side view of the machine shown with the weeder shanks, seeding tubes and cultivating points in working relation to the ground, parts of the machine being omitted for convenience of illustration and with parts broken away and in section.

FIG. 15 is a top plan view showing parts of the frame of the machine and including the hydraulic element and the seeding elements depth control connections, also showing fragments of the upper cross shaft, rocker shaft and depth control shaft.

FIG. 16 shows an enlarged fragment of a frame side channel bar with mounting brackets for a wheel axle shaft and including a side brace bar, taken from the inside.

FIG. 17 shows a detail enlarged side view of a fragment of a seed delivery standard and cultivating point, shown broken away in part.

FIG. 18 is a front end view of the machine shown with parts omitted and in part broken away and in section.

FIG. 19 shows a rear end view of the machine, with parts broken away.

FIG. 20 is an enlarged top view of a fragment of the machine on the right side, and including one of the springs for cushioning the weeder rod carrying shanks as a unit, and in part the drive sprockets and chains for the weeder rod, and a fragment of the depth control shaft.

FIG. 21 is an enlarged side view of a fragment of the machine taken from the right side, showing the driving connections on that side for the shafts and the chain release.

FIG. 22 is an enlarged top view of the parts as in FIGURE 20, but showing corresponding parts on the left side of the machine.

FIG. 23 is an enlarged side view of a fragment of the machine taken from the left side, showing the driving connections on that side for the shafts, and including the chain release.

Having reference to the drawings, the frame for the machine includes front and rear cross bars 1 and 2, and side bars 3 and 4 (FIG. 2) all of channel iron and connected to form a rectangular whole with the channels turned inward, and the frame so formed suitably reinforced at the corners.

The frame is carried rearwardly by wheels 5 with hubs 6' fixed on stub axle shafts 6 mounted in bearing brackets 7 and 8 (FIGS. 1, 2 and 18) secured depending from the frame side bars 3 and 4. These brackets are reinforced by brace rods 9 (FIG. 2) and further braces 10 (FIG. 16) on the inside. Forwardly the frame is carried on castor wheels 11 (FIGS. 1 and 18) rotatable in castor brackets 12 mounted to turn in two pairs of light channel frame bars 14 and 15 (FIGS. 1 and 2) that forwardly converge and carry bearings 16 for mounting the castor brackets.

A lower cross bar 17 (FIG. 18) is suspended from the front frame bar 1, by angle plates 18 and further angle plates 19 attaching to the outer bars of the pairs of brace bars 14 and 15. To the lower cross bar 17, and to the front frame bar 1 and the inner of the frame bars 14 and 15 are attached depending brackets 19 (FIG. 18) to which is pivotally connected a drift bar 20 (FIGS. 1, 2 and 18).

The frame above described carries seeding, cultivating and weeding elements mounted for operation as a set of separate units co-ordinated for operation as a complete unitary whole.

The seeding unit of the combination (FIGS. 1, 2 and 14) includes a series of pairs of arms 21 in three lengths (FIG. 2), these arms pivoting on lugs 22 attached to the lower frame cross bar 17. Rearwardly the arms 21 carry three rows of cultivator points 23 on tubular seed tube standards 24 that include seed diverting lips 24′ (FIG. 17) and integral wings 25 to which the arms 21 attach reinforced by braces 26. These seeding elements and cultivator points are arranged uniformly spaced across the width of the machine and preferably as shown to give maximum trash clearance, the same alternate position of each set of these elements being maintained. The points act as seed openers in addition to their function as cultivating shovels, and for this latter purpose wider points could be used as desired.

Seed to these elements is carried from seed boxes 27 and 28 (FIGS. 1 and 19) mounted on brackets 29 on the side channel frame bars 1 and 2, and to the inner frame bars 14 and 15, and to a pair of light hydraulic element support frame bars 30 (FIGS. 2 and 18) mounted on the front and rear frame bars 1 and 2 spaced apart.

The seed boxes are mounted approximately over the center row of seeding elements and from these suspend driven grain feeds 31 (FIGS. 1 and 19) attached to the bottoms of the seed boxes and delivering through flexible tubes 32 to the point carrying tubular standards 24.

The drive for the grain feeds (FIGS. 19, 20 and 21) is separate for each seed box and is obtained from sprockets 33 attached to the stub axle shafts 6 that are fixed in the wheel hubs 6′, said sprockets connecting by chains 34 to sprockets 35 on shafts 36 with chain tightener 34′ (FIGS. 22 and 23). The shaft 36 is mounted in suitable bearings on the frame side bars 1 and 2 and to the outer of the channel frame bars 14 and 15. Chains 37 fit over sprockets 40 on feed run shafts 39 with the chains extending down over idler sprockets, as indicated at 41, which are adjustably attached to the lower ends of swinging brackets 42 that are pivotally attached on suitable bearings on the shafts 39. Arms 44 are connected by rods 43 to the lower ends of the swinging brackets 42, so that when the cultivator shovels on the seed tubes 24 are lowered to the ground the outer sides of the chains 37 engage the sprockets 38 on the shafts 36, rotating the feeds shafts 39 in reverse direction to the travel of the ground wheels, metering out the grain from the several feed runs towards the front in view of the operator.

The swinging bracket arms 42 are engaged by rods 43 mounted pivoted to and endwise slidable in brackets 44 attached to a pressure arm shaft 45 (FIG. 1) mounted on upstanding brackets 46 (FIGS. 3 and 4) attached by bolts 47 to the frame side bars 1 and 2, and to the light channel frame bars 14 and 15, and also to the frame bars 30, the rods 43 being held by springs 48 with the swinging bracket arms normally in engagement with the chains 37. The pressure of the springs 48 may be varied by nuts 49 threaded on the rods 43, and the arrangement also provides an extra release in case of locking up.

The pressure arm shaft 45 (FIGS. 1, 14 and 15) carries arms 50 attached thereto by U clamps 51, and in these arms pressure rods 51′ are slidable, mounted in any suitable manner, such, for example, as shown at 13 in United States Patent Number 881,131. The pressure rods are pivotally attached to the arms 50 and on the rods are springs 52 opposing endwise movement of the rods, it being understood such a spring cushioning attachment would be provided for each pair of arms 21 carrying the seeding elements.

The pressure arm shaft 45 has fixed thereto downwardly extending radial arms 53 (FIG. 14) pivotally engaged by rods 54 that rearwardly pivotally attach to downwardly extending radial arms 55 fixed to a tubular control shaft 56 that is mounted to turn in brackets 57 attached to the frame light channel bars 14 and 15, and to the bars 30. The shaft 56 has fixed thereto a downwardly extending arm 58 pivotally engaged by a hydraulic element 59 (FIGS. 14–15) anchored by a bracket 60 between the pair of channel frame bars 30. By these connections the seeding elements may be raised or lowered by the hydraulic element 59.

The weeding elements for the machine consist of a number of shanks 62 (FIG. 5) securely attached to the cross shaft 63 that is carried free to turn in plates 64 (FIGS. 5 to 10). These plates are attached by bolts 65 to further plates 66 that are fixed to a cross bar 67 (FIGS. 1, 2, 6, 14 and 19). This cross bar is fixed to arms 68 (FIGS. 1 and 14) that pivot on the stub axle shafts 6 for the wheels 5.

The plates 64 include slotted openings 69 combining with slots 70 in the plates 66 to form seats in which is free to turn a rocker shaft 71 to which are fixed at intermediate points forwardly extending arms 72. To the free ends of arms 72 pivotally attach by pins 72′ angle links 73 that in turn are pivotally attached to depending wings 74 on the upper ends of the shanks 62. The arms 72 are held upward at their forward ends against adjusting bolts 75 that are threaded into lugs 67′ on the cross bar 67 to provide adjustment in the release of the weeder shanks.

The shanks 62 carry free to rotate in shoes 76 a rotary weeding rod 77 (FIGS. 5 and 19). The rod 77 is driven from a drive wheel sprocket 86 (FIG. 2) by a chain 84 to a sprocket 85 on a drive sleeve 80 (FIG. 19). On this sleeve is an upper bevelled gear 83 engaging with a lower gear 82 that is carried on a shaft 79 having its outer end supported by a bracket 81 which is securely attached to the shaft 63 by a key and set screw indicated at 87. The shaft 79 is connected to a universal joint 78 that connects to the rotary rod 77, which rod is carried and rotated in a reverse direction to the travel of the machine in the several shoes 76 supported by the shanks 62. The mounting of the weeder assembly by the bars 68 on the stub axles 6 permits it to be raised or lowered without affecting the tension of the chain 84.

For raising and lowering the shank assembly three arms 88 are fixed to the control shaft 56 (FIGS. 1, 11, 12, 13, 14, 15 and 19). The arms include plates 89 fixed thereto in which are mounted rods 90 held thereon by a sleeve 91 on each and nuts 92 for vertical adjustment and mounted between washers 93 that permit a limited pivotal movement of the rods and arms. Couplings 94 pivotally attach the rods 90 to lugs 95 on the cross bar 67, and between these couplings on the rods 90 are coiled springs 96 (FIG. 14) cushioning the upward movement of the shank unit, all the shanks 62 connecting by the arms 72 on the rocker shaft 71 to move as a unit when an obstruction is encountered by one of the shanks, this upward movement being cushioned initially by the springs 96.

Additional spring cushioning for the soil working elements is shown in detail in FIGURES 20 and 22. This consists of brackets 97 attached to the cross bar 67 and to which are attached springs 98 by eye bolts 99 at one end. The other ends of the springs are attached to upward arms 100 fixed to the rocker shaft 71.

In the use of the implement the control of the cultivating, seeding and weeding is through the hydraulic element 59 (FIGS. 14–15) which attaches to the arms 58 on the control shaft 56 from which the arms 88 rearwardly extend and are connected to raise (FIG. 1) or to lower (FIG. 14) the cross bar 67 that carries the shanks 62 that support the rotary rod 77. The control shaft 56 also carries the arms 55 that are pivotally attached to the bars 54, these bars having their forward ends attached to the lower ends of the arms 53 on the shaft 45 to which is attached the seeding and cultivating elements carried on the arms 27 that pivotally attach to the cross bar 17. The depth in the soil of the cultivating, seeding and weeding elements are controlled by the hydraulic cylinder 59 rotating the shaft 56. A means can be provided whereby the rod 77 and the cultivator shovels may vary one with the other by additional holes in the arms 54, as shown at 54' in FIGURE 14.

The rod weeder shanks 62 and rotary rod 77 are cushioned for vertical movement by the springs 96 on the rods 90 (FIGS. 14 and 19). To this is added an additional cushion or protection should any of the shanks or rotary ground rods strike an obstruction causing rearward pressure on the rod 77 (FIG. 5) or the shoes 76, which latter by the shanks 62 and cross shaft 63 would cause the whole of the assembly to swing rearwardly and upward. This in turn would cause the downwardly extending arms 74 to swing back with the links 73, that are pivotally attached to the arms 72 on the rocker shaft 71, causing the rocker shaft to rotate bringing the arms 100 (FIGS. 20 and 22) forward against the tension of the coil springs 98 that attach by the adjusting bolts 99 supported by the spring brackets 97, the forward ends of which are attached to the cross bar 67. When the obstruction is passed over the shanks and rotary rod are brought forward by the springs 98 to their normal locked position.

The weeder rod 77 in addition to its weeding function is effective in packing the soil over the seeded area, serving an important purpose.

The square feed run shaft 39, as shown in FIGURES 21 and 23, is run reversely by the chain 37 engaging the sprocket 38 on the shaft 36, thus metering the grain out in full view of the operator of the machine which is an important advantage.

I claim:

1. In a cultivating, seeding and weeding implement having a main frame and ground wheels supporting the frame and stub axle shafts rotatable in the frame and on which the ground wheels are fixed, a pair of seed boxes mounted on the frame, said boxes each having grain feeds and a feed run shaft, driving means for the feed run shafts comprising shafts mounted in the frame connected by chains and sprockets to be driven from the ground wheel stub axle shafts, swinging arms pivoted on the feed run shafts, sprockets mounted on the swinging arms connected by sprockets and chains in driving relation to the feed run shafts, and further sprockets on the shafts that are connected to be driven by the stub axle shafts, said further sprockets being engageable by the chains connecting the sprockets on the swinging arm and feed run shafts and disengageable therefrom by moving the swinging arms to and from said chains.

2. In a soil cultivating, seeding and weeding implement as set out in claim 1 and including a pressure arm shaft journalled on the main frame, a radial arm fixed to the pressure arm shaft in opposing relation to each swinging arm, and rods pivotally connecting the radial arms and swinging arms by which turning the pressure arm shaft moves the swinging arms to bring the chains connecting the sprockets on the swinging arm and feed run shafts in or out of engagement with the further sprockets on the shafts that are connected to be driven by the stub axle shafts.

3. In a soil cultivating, seeding and weeding implement as set out in claim 2 and including arms pivotally mounted in the frame rearwardly extending and by which the seeding tubes for the implement are carried and rods for rearwardly suspending the arms, the seeding tubes connecting to receive grain from the grain feeds; means for raising and lowering the seeding tubes comprising radial arms fixed to the pressure arm shaft and pivotally connected one to each of said rods by which the pressure arm shaft when turned raises or lowers the seeding tubes in or out of working relation to the ground simultaneously with the disengagement or engagement of the chains connecting the sprockets on the swinging arms and the feed run shafts from or with the further sprockets on the shafts that are connected to be driven by the stub axle shafts.

4. In a soil cultivating, seeding and weeding implement as set out in claim 2 and having a series of weeder rod carrying shanks and means mounting the shanks pivoted on the ground wheel stub axle shafts to be raised or lowered as a unit; a control shaft, means journalling the control shaft transversely on the main frame, radial arms fixed to the control shaft and connected to the means mounting the shanks pivoted on the ground wheel stub axle shafts for raising and lowering said shanks as a unit by turning the control shaft, and means connecting the control and pressure arm shafts by which turning the control shaft turns the pressure arm shaft correspondingly by which all the shanks and seeding tubes may be simultaneously raised and lowered.

References Cited in the file of this patent

UNITED STATES PATENTS

| | | |
|---|---|---|
| 410,436 | Packham | Sept. 3, 1889 |
| 881,131 | Kalkhurst | Mar. 10, 1908 |
| 1,043,247 | Olson | Nov. 5, 1912 |
| 1,112,215 | Jordon | Sept. 29, 1914 |
| 1,281,325 | Fetzer | Oct. 15, 1918 |
| 1,305,850 | White | June 3, 1919 |
| 1,440,216 | Fisher | Dec. 26, 1922 |
| 1,484,318 | Barnhart | Feb. 19, 1924 |
| 1,713,474 | Lindquist | May 14, 1929 |
| 1,770,641 | Brennan | July 15, 1930 |
| 2,046,466 | Kolterman | July 7, 1936 |
| 2,055,388 | Rhodes | Sept. 22, 1936 |
| 2,176,541 | Morris | Oct. 17, 1939 |
| 2,605,686 | Starr | Aug. 5, 1952 |
| 2,699,714 | Fundersland | Jan. 18, 1955 |
| 2,827,005 | Calkins | Mar. 18, 1958 |
| 2,968,265 | Immesoete | Jan. 17, 1961 |
| 3,033,135 | Gouin | May 8, 1962 |